US012323499B2

(12) United States Patent
Zhong et al.

(10) Patent No.: US 12,323,499 B2
(45) Date of Patent: Jun. 3, 2025

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Lei Zhong, Chuo-ku (JP); Jing Ma, Yokohama (JP); Xiao Shao, Kawasaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/305,419

(22) Filed: Apr. 24, 2023

(65) Prior Publication Data

US 2023/0353661 A1 Nov. 2, 2023

(30) Foreign Application Priority Data

Apr. 28, 2022 (JP) ................. 2022-074037

(51) Int. Cl.
H04L 67/60 (2022.01)
(52) U.S. Cl.
CPC .................. H04L 67/60 (2022.05)
(58) Field of Classification Search
CPC ....................................... H04L 67/60
USPC ....................................... 709/223
See application file for complete search history.

(56) References Cited

U.S. PATENT DOCUMENTS

| 10,079,861 | B1* | 9/2018 | Siddiqi | H04L 65/1066 |
| 2020/0358689 | A1* | 11/2020 | Lee | H04L 43/028 |
| 2021/0321251 | A1* | 10/2021 | Colom Ikuno | H04W 76/11 |
| 2022/0232369 | A1* | 7/2022 | Puente Pestaña | H04L 67/14 |
| 2022/0294868 | A1* | 9/2022 | Muralidhara | H04W 48/18 |
| 2022/0394525 | A1* | 12/2022 | Lee | H04L 65/1053 |
| 2023/0077340 | A1* | 3/2023 | Han | H04L 43/06 709/224 |

(Continued)

FOREIGN PATENT DOCUMENTS

| GB | 2 593 217 | * | 9/2021 | ............. H04L 12/24 |
| GB | 2593217 A | | 9/2021 | |

(Continued)

OTHER PUBLICATIONS

3GPP TSG-SA WG2#151E e-meeting, "TR 23.700-80:KI#7 New Sol-Composite exposure service for 5GS assistance to FL member selection", Toyota Motor Corporation, May 16-20, 2022, 3 pages.

(Continued)

Primary Examiner — Ario Etienne
Assistant Examiner — Kidest Mendaye
(74) Attorney, Agent, or Firm — Oblon, McClelland, Maier & Neustadt, L.L.P.

(57) ABSTRACT

An information processing apparatus includes a processor configured to receive a request including at least two identification information pieces among a plurality of identification information pieces and a condition under which at least two information pieces that are respectively obtained for the at least two identification information pieces are composited, the plurality of identification information pieces specifying types of information related to a first service and a second service each for exposing a network function of a predetermined network, and transmit first information that is obtained by compositing the at least two information pieces under the condition.

9 Claims, 8 Drawing Sheets

(56) References Cited

U.S. PATENT DOCUMENTS

2023/0269141 A1* 8/2023 Han ................. H04W 88/18
2023/0379854 A1* 11/2023 Chong ............... H04W 60/00
2023/0403169 A1* 12/2023 Marquezan .......... H04L 41/142

FOREIGN PATENT DOCUMENTS

JP       2010-224959       10/2010
WO   WO-2022078575 A1 * 4/2022 .............. H04W 8/08

OTHER PUBLICATIONS

3GPP TS 23.502 V17.4.0 "Procedures for the 5G System (5GS); Stage 2 (Release 17)", Mar. 2022, 738 pages.
3GPP TS 23.288 V17.4.0 "Architecture enhancements for 5G System (5GS) to support network data analytics services (Release 17)", Mar. 2022, 205 pages.
3GPP TSG-WG SA2 Meeting #150E e-meeting, "TR 23.700-80: KI#7—5GS assistance for FL member selection using QoS monitoring", Apr. 6 to 12, 2022, 4 pages.
ETRI, KI#2: New solution for UP-based 5GC information exposure to UE, 3GPP TSG SA WG2 #150E S2-2202445, Internet URL:https://www.3gpp.org/lt_p/tsg_sa/WG2_Arch/TSGS2_150E_Electronic_2022-04/Docs/S2-2202445.zip, Mar. 29, 2022.
3GPP TR 23.700-80 V0.2.0, Apr. 20, 2022, pp. 65-73.

* cited by examiner

FIG. 4

Nnef_CompositeExposure_Subscribe
■ Service operation name: Nnef_CompositeExposure_Subscribe
■ Description: The NF consumer subscribes or modifies an existing subscription on composite exposure information.
■ Inputs: list of target UEs (GPSI, SUPI, External Group Identifier, S-NSSAI, Internal Group Identifier, UE addressing information (IP or MAC address(es)) , or indication that any UE is targeted), Service name, Event ID(s),  Event Reporting Inforimation defined in Table 4.15.1-1 of TS23.502, Service name, Analytics ID(s), Analytics Filter Information defined in Section 6 of TS23.288, Analytics Reporting Information, condition (AND/OR)
■ Inputs, Option:  Event Filter(s) defined in TS23.502, Application ID, Area info (TA/Cell ID, geographical area), Subscription Correlation ID (in the case of modification of the subscription), Expiry time, Action
■Outputs: When the subscription is accepted: Subscription Correlation ID, Expiry time (required if the subscription can be expired based on the operator's policy).

FIG. 5

Nnef_CompositeExposure_Notify
■ Service operation name: Nnef_CompositeExposure_Notify
■ Description: NEF reports the information to the NF consumer that has previously subscribed.
■ Inputs: list of result UEs that have satisfied all events, analytic information and conditions in the subscribe request (GPSI, SUPI, External Group Identifier, S-NSSAI, Internal Group Identifier, UE addressing information (IP or MAC address(es))), Service name, Event ID(s), Service name, Analytic ID(s), Event information (defined on a per Event ID basis), Analytic information (defined on a per Analytic ID basis), Notification Correlation Information.
■ Outputs: Operation execution result indication.

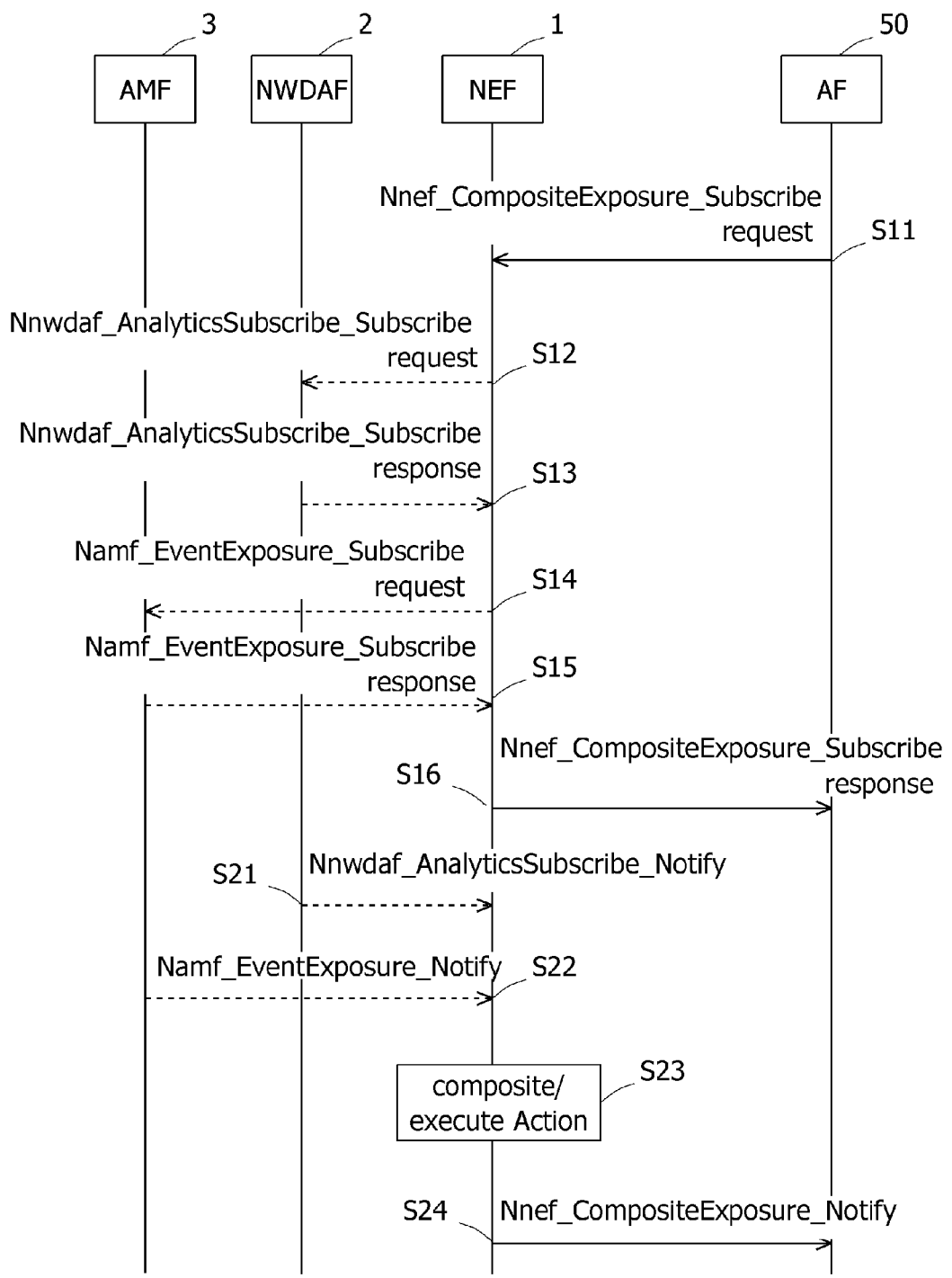

INFORMATION PROCESSING APPARATUS AND INFORMATION PROCESSING METHOD

CROSS REFERENCE TO THE RELATED APPLICATION

This application claims the benefit of Japanese Patent Application No. 2022-074037, filed on Apr. 28, 2022, which is hereby incorporated by reference herein in its entirety.

BACKGROUND

Technical Field

The present disclosure relates to an information processing apparatus and an information processing method.

Description of the Related Art

With 5G core network, Network Exposure Function (NEF) that is a function of exposing Network Functions (NF) to a third party such as a service provider is introduced (for example, following Non-Patent Documents 1 and 2). The network functions that are exposed include various functions such as statistical information analysis, monitoring of event, provisioning of parameters related to User Equipment (UE), and monitoring of QoS of UE, for example.

CITATION LIST

Non-Patent Document

[Non-Patent Document 1] 3GPP TS 23.502 V17.4.0 "Procedures for the 5G System (5GS); Stage 2 (Release 17)", March 2022
[Non-Patent Document 2] 3GPP TS 23.288 V17.4.0 "Architecture enhancements for 5G System (5GS) to support network data analytics services (Release 17)", March 2022
[Non-Patent Document 3] 3GPP TSG-WG SA2 Meeting #150E e-meeting, "TR 23.700-80: KI #7-5GS assistance for FL member selection using QoS monitoring", 6 to 12 Apr. 2022

A subject object of the present disclosure is to provide an information processing apparatus and a method that are capable of reducing a processing delay related to exposure of a network function of a predetermined network.

SUMMARY

An aspect of the present disclosure is an information processing apparatus including a processor configured to:
 receive a request including at least two identification information pieces among a plurality of identification information pieces and a condition under which at least two information pieces that are respectively obtained for the at least two identification information pieces are composited, the plurality of identification information pieces specifying types of information related to a first service and a second service each for exposing a network function of a predetermined network; and
 transmit first information that is obtained by compositing the at least two information pieces under the condition.

Another aspect of the present disclosure is a method executed by a computer, including:
 receiving a request including at least two identification information pieces among a plurality of identification information pieces and a condition under which at least two information pieces that are respectively obtained for the at least two identification information pieces are composited, the plurality of identification information pieces specifying types of information related to a first service and a second service each for exposing a network function of a predetermined network; and
 transmitting first information that is obtained by compositing the at least two information pieces under the condition.

According to the present disclosure, a processing delay related to exposure of a network function of a predetermined network may be reduced.

BRIEF DESCRIPTION OF THE DRAWINGS

FIG. 4 is an example of specifications of the Subscribe API;
FIG. 5 is an example of specifications of the Notify API;
FIG. 8 is a diagram illustrating an example of a sequence of the Nnef_CompositeExposure service.

DESCRIPTION OF THE EMBODIMENTS

Figure 1:
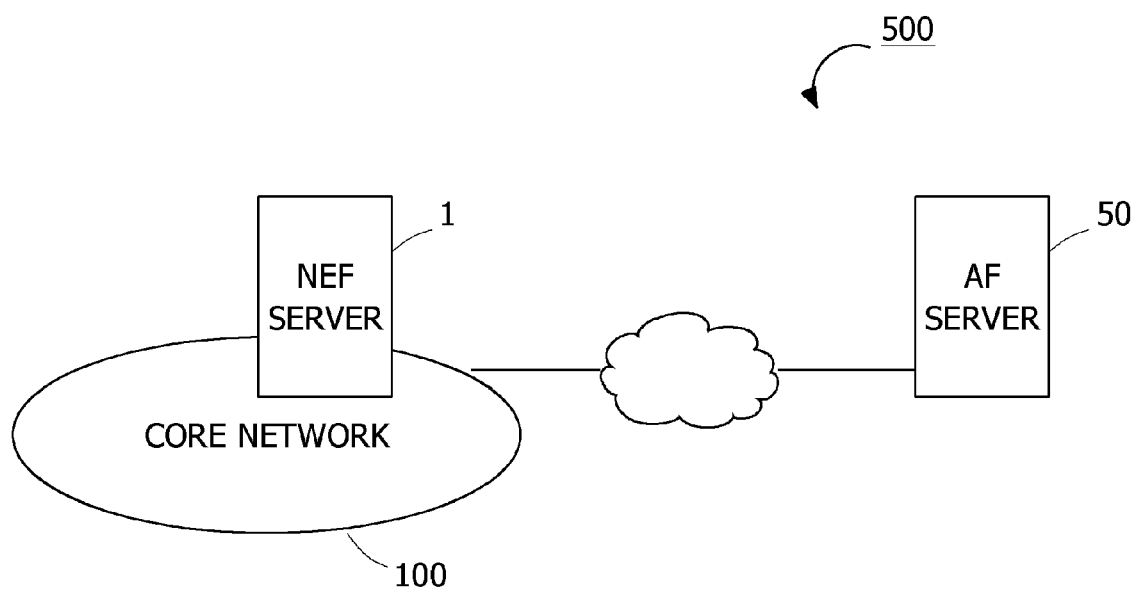
FIG. 1 is a diagram illustrating an example of a system configuration of a network system according to a first embodiment.

For example, an NEF exposes a network function as an Application Programming Interface (API). An API is prepared for each service, and an external Application Function (AF) may access the NEF and use a desired network function through the NEF by using the API, for example.

As examples of a service for acquiring information in a network, there are Nnef_EventExposure and Nnef_AnalyticsExposure. Nnef_EventExposure is a service for reporting a result of monitoring an event. As events, there are connection of a terminal (UE reachability), disconnection of a terminal (Loss of Connectivity), reporting of a location of a terminal (Location Reporting), the number of UEs present in a certain area (Number of UEs present in a geographical area), and the like. Nnef_AnalyticsExposure is a service for reporting statistical information of a network. For example, statistical information of a network includes information about performance of the network, information about QoS, and congestion information.

For example, it is assumed that there are information pieces A, B that can be acquired by Nnef_EventExposure and information X that can be acquired by Nnef_AnalyticsExposure. In the case where it is desired to acquire information that is obtained by compositing the information A and the information X by logical disjunction or logical conjunction, an apparatus that is a request source requesting the information requests, to the NEF, the information A and the information X through an API for Nnef_EventExposure and an API for Nnef_AnalyticsExposure to acquire the information A and the information X, respectively, and performs calculation of logical disjunction or logical conjunction on the information A and the information X. Furthermore, for example, in the case where it is desired to acquire information that is obtained by compositing the information A and the information B by logical conjunction, the request source apparatus requests, to the NEF, the information A and the information B through the API for Nnef_EventExposure to acquire the information A and the information B, and performs calculation of logical conjunction on the information A and the information B.

As described above, in the case where it is desired to acquire information that is obtained by compositing information pieces provided by different services by logical conjunction or logical disjunction and the case where it is desired to acquire information that is obtained by compositing a plurality of types of information from a same service by logical conjunction, an apparatus that is a request source performs a process including a plurality of steps. In this regard, in an aspect of the present disclosure, a request source apparatus is enabled to acquire, in one step, information that is obtained by compositing a plurality of types of information by logical conjunction or logical disjunction. Additionally, such an objective is not limited to occurring in the case of 5G core network, and may occur in relation to any network a function of which is exposed to the outside.

More specifically, an aspect of the present disclosure is an information processing apparatus including a processor that receives a request and transmits a notification corresponding to the request. The request includes at least two identification information pieces among a plurality of identification information pieces and a condition under which at least two information pieces that are respectively obtained for the at least two identification information pieces are composited, the plurality of identification information pieces specifying types of information related to a first service and a second service. Each of the first service and the second service is a service for exposing a network function of a predetermined network. The notification corresponding to the request is first information that is obtained by compositing the at least two information pieces under the condition.

For example, the service for exposing a network function of a predetermined network is the NEF. For example, the information processing apparatus is a dedicated server that operates as the NEF in a 5G core network. Note that an apparatus that operates as the NEF may be any apparatus where a computer is installed, without being limited to the dedicated server. For example, the processor is a processor such as a Central Processing Unit (CPU) or a Digital Signal Processor (DSP). Moreover, an apparatus that operates as the NEF may be a dedicated apparatus. Moreover, the processor may be a dedicated circuit that is capable of performing an operation of the NEF.

In the case where the service for exposing a network function of a predetermined network is the NEF, the first service is an Nnef_EventExposure service, for example. In the case where the first service is the Nnef_EventExposure service, the plurality of identification information pieces specifying types of information related to the first service are Event IDs. The second service is an Nnef_AnalyticsExposure service, for example. In the case where the second service is the Nnef_AnalyticsExposure service, the plurality of identification information pieces specifying types of information related to the second service are Analytics IDs. The condition under which at least two information pieces that are obtained for the identification information pieces are composited is at least one of logical disjunction and logical conjunction. Note that the service for exposing a network function of a predetermined network is not limited to the NEF. Moreover, the first service and the second service may be any services of the NEF without being limited to the Nnef_EventExposure service and the Nnef_AnalyticsExposure service.

According to an aspect of the present disclosure, an apparatus that is a request source may acquire information that is obtained by compositing desired types of information under a desired condition, simply by transmitting a request. Accordingly, the apparatus that is the request source may acquire desired information by performing a one-step process. A processing delay in the acquisition of the desired information by the apparatus as the request source may thus be reduced. Moreover, communication between the information processing apparatus and the apparatus as the request source may be suppressed to transmission of the request from the apparatus as the request source to the information processing apparatus and transmission of the first information from the information processing apparatus to the apparatus as the request source. Accordingly, data traffic between the information processing apparatus and the apparatus as the request source may be reduced, and bandwidth consumption of a network may be reduced.

For example, in the case of the NEF, the apparatus that is the request source may acquire a plurality of types of information related to a plurality of services or may acquire information that is obtained by compositing a plurality of types of information under a specified condition, by executing one API.

In an aspect of the present disclosure, the request may include action information specifying an action that is executed in relation to a user terminal included in the first information. In this case, the processor may execute the action specified by the action information included in the request, on the user terminal included in the first information. The apparatus as the request source may thus execute a specified action on predetermined UE simply by transmitting a request, and processing efficiency may be increased.

In an aspect of the present disclosure, the request may further include application identification information specifying an application. In this case, the processor may transmit second information, in the first information, matching the application identification information. The apparatus as the request source may thus acquire the second information that is extracted in relation to a desired application.

In an aspect of the present disclosure, the request may further include area identification information specifying an area as a target. In this case, the processor may transmit third information, in the first information, matching the area identification information. The apparatus as the request source may thus acquire the third information that is extracted in relation to a desired area.

The present disclosure may specify a method as another aspect. The method executed by a computer includes receiving a request including at least two identification information pieces among a plurality of identification information pieces and a condition under which at least two information pieces that are respectively obtained for the at least two identification information pieces are composited, the plurality of identification information pieces specifying types of information related to a first service and a second service each for exposing a network function of a predetermined network, and transmitting first information that is obtained by compositing the at least two information pieces under the condition. The present disclosure may specify, as other aspects, a program for causing a computer to perform processes of the information processing apparatus described above and a non-transitory computer-readable recording medium recording the program.

In the following, embodiments of the present disclosure will be described with reference to the drawings. The configuration of the embodiments described below are examples, and the present disclosure is not limited to the configuration of the embodiments.

First Embodiment

FIG. 1 is a diagram illustrating an example of a system configuration of a network system 500 according to a first embodiment. The network system 500 includes a core network 100. In the first embodiment, the core network 100 is assumed to be a 5G network system. The core network 100 includes an NEF server 1. The NEF server 1 is a server that implements an NEF that is one of Network Functions (hereinafter "NF(s)") of the 5G core network. As other NFs, the core network 100 further includes servers that implement functions such as Access and Mobility Management Function (AMF), Network Data Analytics Function (NWDAF), Session Management Function (SMF), User Data Repository (UDR), and Unified Data Management (UDM), for example.

An Application Function (AF) server 50 is an external apparatus that is managed by a service provider that is a third party, for example. In the first embodiment, a description is given assuming that the AF server 50 is an apparatus as a request source that receives a service of the NEF. However, an apparatus as a request source that receives a service of the NEF is not limited to the AF server 50.

When a request requesting exposure of a network function of the core network 100 is received from the AF server 50, the NEF server 1 performs a process according to the request by issuing an inquiry to the corresponding NF. In the first embodiment, the NEF server 1 provides an Nnef_CompositeExposure service for providing information that is obtained by compositing, under a specified condition, a plurality of specified types of information that can be acquired through the Nnef_EventExposure service and the Nnef_AnalyticsExposure service.

In relation to the Nnef_EventExposure service, the NEF server 1 receives, from the AF server 50, an Nnef_EventExposure_Subscribe request requesting exposure of information. The Nnef_EventExposure_Subscribe request includes an Event ID specifying a type of information that is desired to be acquired. The NEF server 1 acquires information corresponding to the Event ID from an NF, in the core network 100, corresponding to the Event ID, and transmits the information to the AF server 50 by an Nnef_EventExposure_Notify message. The Nnef_EventExposure_Subscribe request is an example of "request".

Also in relation to the Nnef_AnalyticsExposure service, the NEF server 1 receives, from the AF server 50, an Nnef_AnalyticsExposure Subscribe request requesting exposure of information. The Nnef_AnalyticsExposure Subscribe request includes an Analytics ID specifying a type of information that is desired to be acquired. The NEF server 1 acquires information corresponding to the Analytics ID from an NF, in the core network 100, corresponding to the Analytics ID, and transmits the information to the AF server 50 by an Nnef_AnalyticsExposure Notify message. Nnef_EventExposure_Subscribe, Nnef_EventExposure_Notify, Nnef_AnalyticsExposure Subscribe, and Nnef_AnalyticsExposure Notify are prepared as different APIs.

On the other hand, in relation to the Nnef_CompositeExposure service, the NEF server 1 receives, from the AF server 50, an Nnef_CompositeExposure_Subscribe request requesting exposure of information. The Nnef_CompositeExposure_Subscribe request includes at least one Event ID and at least one Analytics ID, a plurality of Event IDs, or a plurality of Analytics ID. Furthermore, the Nnef_CompositeExposure_Subscribe request includes a specified condition under which information pieces corresponding to a plurality of IDs including the Event ID(s) and/or the Analytics ID(s) are composited. Conditions under which information pieces are composited are logical conjunction (AND) and logical disjunction (OR), for example.

The NEF server 1 acquires, from one or more NFs corresponding to the plurality of IDs including the Event ID(s) and/or the Analytics ID(s), information corresponding to each of the plurality of IDs. The NEF server 1 composites, under the specified condition, a plurality of information pieces that are acquired, and transmits the composited information to the AF server 50 by an Nnef_CompositeExposure Notify message. Nnef_CompositeExposure_Subscribe and Nnef_CompositeExposure Notify are prepared as different APIs.

In the first embodiment, information that is obtained by compositing, under a specified condition, a plurality of types of information acquired from APIs that are different for the Nnef_EventExposure service and the Nnef_AnalyticsExposure service may be provided through one API by the Nnef_CompositeExposure service.

Figure 2:
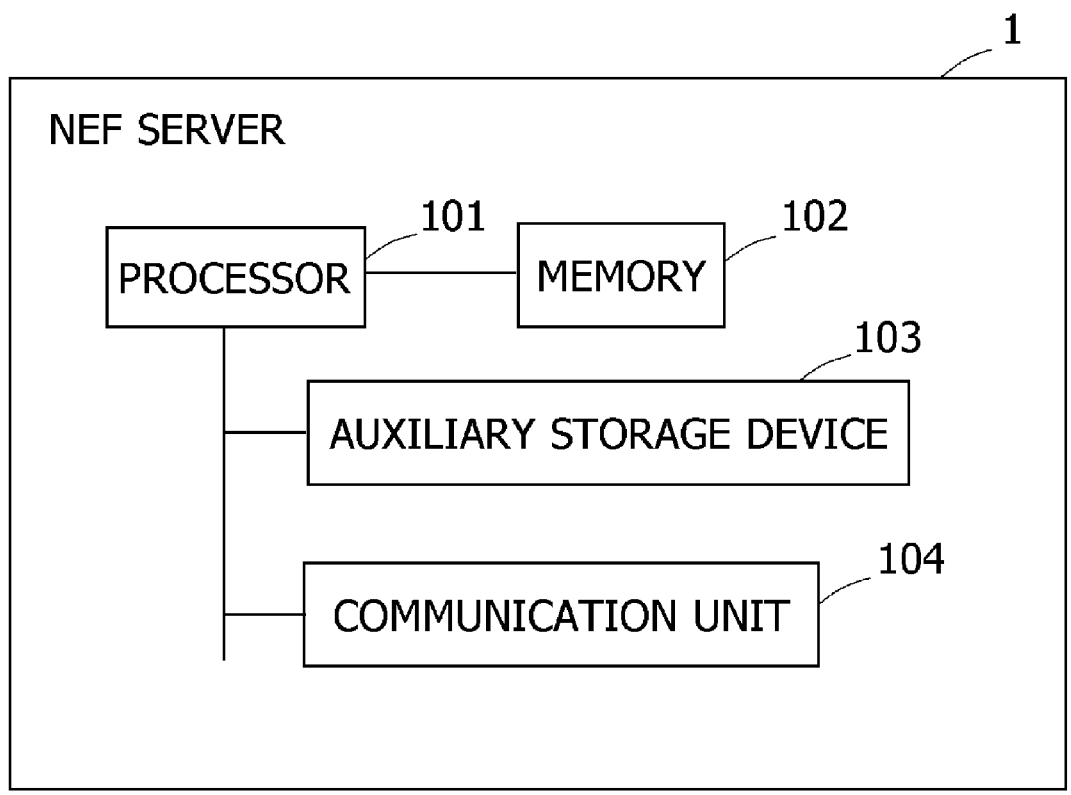
FIG. 2 is an example of a hardware configuration of the NEF server.

FIG. 2 is an example of a hardware configuration of the NEF server 1. For example, the NEF server 1 is a dedicated server. However, the NEF server 1 is not limited to a dedicated server, and may alternatively be a relay apparatus where a dedicated computer for performing a process of the NEF is installed, for example. Moreover, the NEF server 1 may be an apparatus including a dedicated electric circuit such as a Field-Programmable Gate Array (FPGA) or an Application Specific Integrated Circuit (ASIC) for performing a process of the NEF. FIG. 2 illustrates a hardware configuration where the NEF server 1 is a server.

As hardware components, the NEF server 1 includes a processor 101, a memory 102, an auxiliary storage device 103, and a communication unit 104. The memory 102 and the auxiliary storage device 103 are computer-readable recording media. The NEF server 1 is an example of "information processing apparatus". The processor 101, the auxiliary storage device 103, and the communication unit 104 are electrically connected by a bus.

The auxiliary storage device 103 stores a program used to operate as the NEF, and data used by the processor 101 at the time of execution of each program. For example, the auxiliary storage device 103 is an Erasable Programmable ROM (EPROM), a Hard Disk Drive, or a Solid State Drive (SSD). Programs held in the auxiliary storage device 103 include an Operating System (OS), a control program of the NEF, a plurality of APIs of the NEF, and the like.

The memory 102 is a main memory that provides the processor 101 with a work area and a memory area where programs stored in the auxiliary storage device 103 are loaded, and that is used as a buffer. For example, the memory 102 includes a semiconductor memory such as a Read Only Memory (ROM), a Random Access Memory (RAM), or the like.

The processor 101 performs a process of the NEF by loading, into the memory 102, and executing the OS and programs related to the NEF held in the auxiliary storage device 103. For example, the processor 101 is a CPU, a Digital Signal Processor (DSP), or the like. The number of processors 101 is not limited to one, and a plurality of processors 101 may be provided. The processor 101 is an example of "processor".

For example, the communication unit 104 is a Network Interface Card (NIC), an optical line interface, or the like. For example, the communication unit 104 connects to an access network such as a Local Area Network (LAN) or an optical network in a wired manner, and connects to a network N1 via the access network. Note that the communication unit 104 may alternatively be a wireless communication circuit that connects to a wireless network such as a wireless LAN, for example.

Note that the hardware configuration of the NEF server 1 is not limited to the one illustrated in FIG. 2. Moreover, like the NEF server 1, the AF server 50 also includes a processor, a memory, an auxiliary storage device, and a communication unit. For example, the auxiliary storage device of the AF server 50 stores an OS, programs related to applications performed by the AF server 50, an API for using the NEF, and the like.

Figure 3:
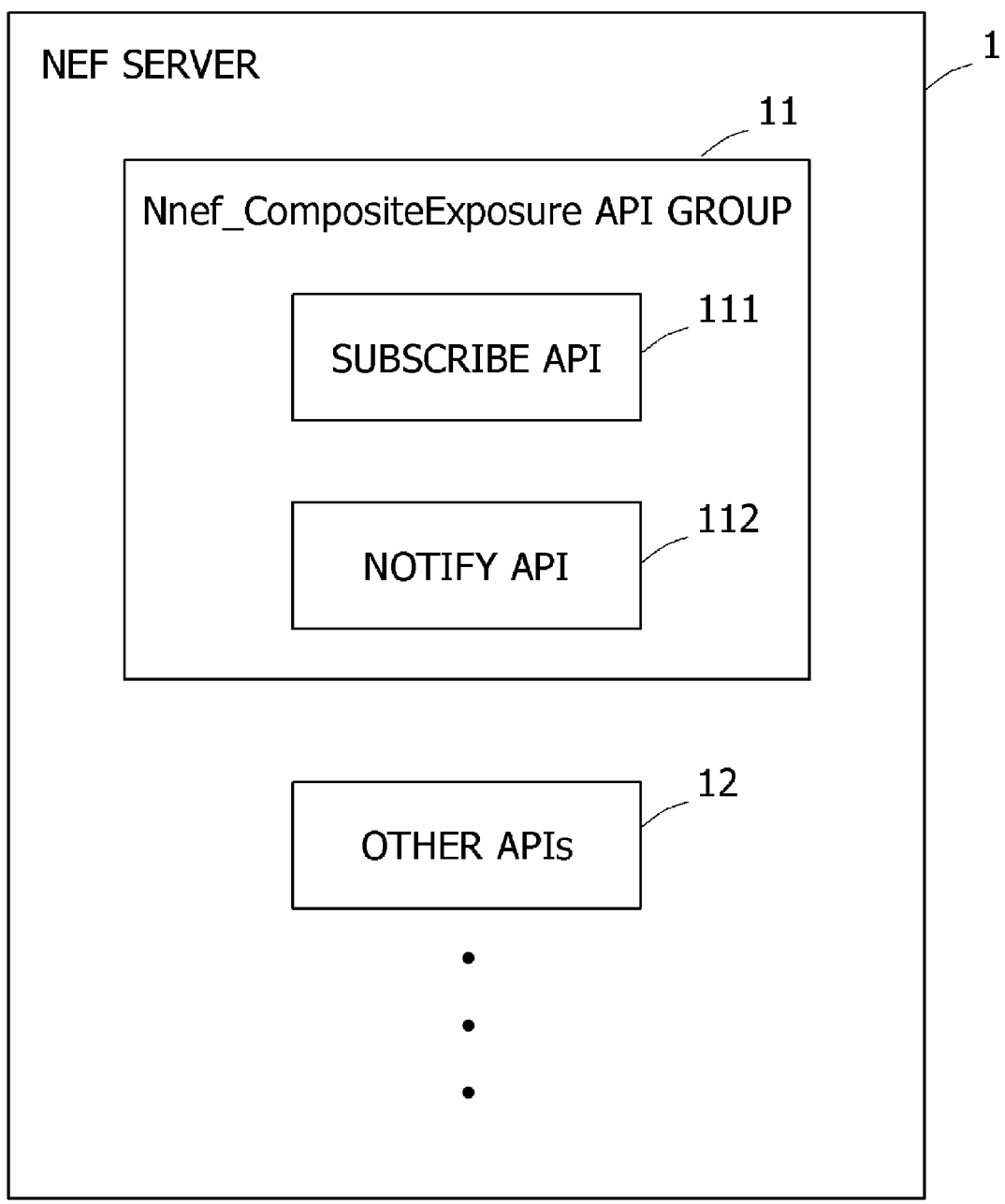
FIG. 3 is a diagram illustrating an example of a functional configuration of the NEF server.

FIG. 3 is a diagram illustrating an example of a functional configuration of the NEF server 1. As functional components, the NEF server 1 includes an Nnef_CompositeExposure API group 11, and a plurality of other APIs 12. The Nnef_CompositeExposure API group 11 is an API group for the Nnef_CompositeExposure service. Other APIs 12 include APIs corresponding to other services that are provided by the NEF. The Nnef_CompositeExposure API group 11 includes Subscribe API 111, and Notify API 112.

FIG. 4 is an example of specifications of the Subscribe API 111. FIG. 4 illustrates specifications related to input and output of the Subscribe API 11. Input to the Subscribe API 111 is the Nnef_CompositeExposure_Subscribe request. That is, "Inputs" and "Inputs, Option" in FIG. 4 are information pieces included in the Nnef_CompositeExposure_Subscribe request. Information pieces that are input to the Subscribe API 111, or in other words, information pieces included in the Nnef_CompositeExposure_Subscribe request, include a list of target UEs, the Event ID and/or the Analytics ID, Event Reporting Information and/or Analytics Reporting Information, Analytics Filter Information, and the condition.

The list of target UEs include identification information of target UEs. As the identification information of UE, Generic Public Subscription Identifier (GPSI), Subscription Permanent Identifier (SUPI), External Group Identifier, Single-Network Slice Selection Assistance Information (S-NSSAI), Internal Group Identifier, IP address, MAC address, or other identification information pieces allowing UE to be identified are used, for example. Furthermore, the identification information of UE is not limited to information that uniquely identifies the UE, and may be information for identify a plurality of UEs in a group, such as a network address of an IP address.

The Event IDs include Location Report, UE moving in or out of Area of Interest, Access Type, Location, Reachability Filter, Total number of Transactions, and Number of UEs present in a geographical area, for example. The Analytics IDs include Network Performance, UE Mobility, UE Communication, Abnormal behavior, User Data Congestion, QoS Sustainability, Dispersion Analytics, WLAN performance, Session Management Congestion Control Experience, Redundant Transmission Experience, and DN Performance, for example. The Nnef_CompositeExposure_Subscribe request may include only a plurality of Event IDs, only a plurality of Analytics IDs, or one or more Event IDs and one or more Analytics IDs. Accordingly, in the following, in the case of referring to the Event ID and the Analytics ID included in the Nnef_CompositeExposure_Subscribe request, an expression "Event ID and/or Analytics ID" will be used.

In the first embodiment, the Event ID and the Analytics ID are identified as a set with a service name. Accordingly, the Event ID is included as a set of service name "Nnef_EventExposure"+Event ID. The Analytics ID is included as a set of service name "Nnef_AnalyticsExposure"+Analytics ID. However, such a case is not restrictive, and the service name may be omitted in the case where there is no overlap between the Event ID and the Analytics ID.

Event Reporting Information and Analytics Reporting Information are each information indicating a parameter related to reporting of information that is obtained according to the Event ID or the Analytics ID. Event Reporting Information and Analytics Reporting Information include a mode of reporting (whether reporting is performed until the upper limit number of times is reached or whether reporting is periodically performed, for example), and the upper limit number of times of reporting or a period of reporting, for example. Those indicated in Table 4.15.1-1 of 3GPP TS 23.502 V17.4.0 may be used as Event Reporting Information and Analytics Reporting Information, for example.

In the case where the Nnef_CompositeExposure_Subscribe request includes only a plurality of Event IDs, only Event Reporting Information is included. In the case where the Nnef_CompositeExposure_Subscribe request includes only a plurality of Analytics IDs, only Analytics Reporting Information is included. In the case where the Nnef_CompositeExposure_Subscribe request includes one or more Event IDs and one or more Analytics IDs, Event Reporting Information and Analytics Reporting Information are included and the two may indicate same contents, or only one of the two may be included.

Analytics Filter Information is information about a parameter for filtering information that is obtained according to the Analytics ID. One that is defined for each Analytics ID in Section 6 of 3GPP TS 23.288 V17.4.0 may be used as Analytics Filter Information, for example.

Accordingly, in the case where the Nnef_CompositeExposure_Subscribe request includes the Event ID, a set of one or more sets of (service name "Nnef_EventExposure"+Event ID) and Event Reporting Information is included. In the case where the Analytics ID is included, a set of one or more sets of (service name "Nnef_AnalyticsExposure"+Analytics ID+Analytics Filter Information)+Analytics Reporting Information is included. The set of service name "Nnef_EventExposure"+Event ID will be hereinafter referred to as event-related information. The set of service name "Nnef_AnalyticsExposure"+Analytics ID+Analytics Filter Information will be hereinafter referred to as analytics-related information.

The condition includes a condition under which information pieces that are respectively obtained for the Event ID(s) and/or the Analytics ID(s) are composited. The condition under which the information pieces are composited is logical conjunction (AND) or logical disjunction (OR). Note that it is also possible to omit the condition. In the case where the condition is omitted, information pieces that are respectively obtained for the Event ID(s) and/or the Analytics ID(s) are composited by logical conjunction.

Next, the Nnef_CompositeExposure_Subscribe request may include, as options, Event Filter, Application ID, Area Information, Subscription Correlation ID, Expiry Time, and Action. Event Filter is information about a parameter for filtering information that is obtained according to the Event ID. For example, at least one Event Filter different for each Event ID is defined in 3GPP TS 23.502 V17.4.0. In the first embodiment, one that is defined in 3GPP TS 23.502 V17.4.0 is used as Event Filter. For example, one that is indicated in Table 5.2.2.3.1-1 of 3GPP TS 23.502 V17.4.0 may be used as Event Filter of an Event ID that takes AMF as an inquiry destination for information. In the case where setting of a filter in the Event ID is specified, Event Filter that is selected from one or more Event Filters that is set for the Event ID is included in the Nnef_CompositeExposure_Subscribe request. In the case where Event Filter is included, the event-related information will be service name "Nnef_EventExposure"+Event ID+Event Filter.

Application ID is included in a case where an application with respect to which information is desired to be acquired is specified. Area Information is included in a case where an area with respect to which information is desired to be acquired is specified. As Area Information, a Tracking Area (TA) ID, a cell ID, or identification information of a geographical area is used, for example.

Subscription Correlation ID is an ID for identifying the Nnef_CompositeExposure_Subscribe service in the NEF server 1 for the AF server 50. Subscription Correlation ID is assigned by the NEF server 1 at the time of initial reception of the Nnef_CompositeExposure_Subscribe request from the AF server 50. Subscription Correlation ID is included in the Nnef_CompositeExposure_Subscribe request in the case where contents of the Nnef_CompositeExposure_Subscribe service are desired by the AF server 50 to be changed. Expiry Time is an expiration time of the Nnef_CompositeExposure_Subscribe service for the AF server 50. Expiry Time is included in a case where the expiration time is specified by the AF server 50.

Action is included in the Nnef_CompositeExposure_Subscribe request in a case where a service that is to be executed in relation to UE included in the information that is obtained by compositing specified Event ID(s) and/or Analytics ID(s) under Condition is specified. Services to be specified by Action include Nnef_ParameterProvision, Nnef_BDTPNegotiation, Nnef_ChargeableParty, Nnef_AFsessionWithQoS, and Nnef_ApplyPolicy. The Nnef_ParameterProvision service is a service for provisioning of a parameter related to the UE. The Nnef_BDTPNegotiation service is a service for provisioning related to Background Data Transfer (BDT). The Nnef_ChargeableParty service is a service for setting charge information about data session of the UE. The Nnef_AFsessionWithQoS service is a service for monitoring QoS of the UE. The Nnef_ApplyPolicy service is a service for applying a BDT policy to the UE. APIs of these services are included in the NEF server 1 as the other APIs 12. For example, Action includes request messages of these services.

Description, in the Nnef_CompositeExposure_Subscribe request, of a part related to information to be acquired is as follows, for example. Note that Action is described only when specified.

Nnef_CompositeExposure_Subscribe request=list of target UEs+(event-related information or analytics-related information)+(condition+event-related information or analytics-related information)^n+Action^k (^n and ^k each indicate repetition of n times or k times; n and k are integers of one or more.)

More specifically, in the case where application of the BDT policy to the UE that is extracted from information based on logical conjunction of information pieces with Event IDs od ID #1 and #2 and Analytics ID of ID #3 is requested, for example, description in Nnef_CompositeExposure_Subscribe request is as follows.

Nnef_CompositeExposure_Subscribe request=list of target UEs+event-related information of ID #1+(AND+event-related information of ID #2)+(AND+analytics-related information of ID #3)+Nnef_ApplyPolicy Create request The Nnef_ApplyPolicy Create request is a message requesting application of the BDT policy.

Next, in the case where the Nnef_CompositeExposure_Subscribe request is received, output from the Subscribe API 111 is an Nnef_CompositeExposure_Subscribe response. That is, "Output" in FIG. 4 is information included in the Nnef_CompositeExposure_Subscribe response. Information that is output from the Subscribe API 111, or in other words, information that is included in the Nnef_CompositeExposure_Subscribe response, includes Subscription Correlation ID. In the case where the Nnef_CompositeExposure service for the AF server 50 is ended based on a policy of an operator of the core network 100, Expiry time is included in the Nnef_CompositeExposure_Subscribe response. Note that the specifications of the Subscribe API 111 illustrated in FIG. 4 are an example, and the specifications of the Subscribe API 111 are not limited to the example illustrated in FIG. 4.

FIG. 5 is an example of specifications of the Notify API 112. FIG. 5 illustrates specifications related to input and output of the Notify API 112. "Inputs" illustrated in FIG. 5 include a list of UEs satisfying the condition specified in the Nnef_CompositeExposure_Subscribe request, Event ID, Analytics ID, Event Information, Analytic Information, and Notification Correlation Information.

Identification information of UE included in the list of UEs is the same as that in the list of UEs in inputs of the Subscribe API 111 illustrated in FIG. 4. As the Event ID and/or the Analytics ID, the same ID as the ID included in the Nnef_CompositeExposure_Subscribe request is included. Additionally, like the inputs of the Subscribe API 111 illustrated in FIG. 4, the Event ID and the Analytics ID are each identified as a set with the service name.

Event Information is information that satisfies the event-related information (Event ID+Event filter) specified in the Nnef_CompositeExposure_Subscribe request. Analytic Information is information that satisfies the analytics-related information (Analytics ID+Analytics Filter Information) specified in the Nnef_CompositeExposure_Subscribe request. In the case where Application ID and/or Area Information is specified in the Nnef_CompositeExposure_Subscribe request, Event Information and Analytic Information also satisfy the Application ID and/or the Area Information in addition to the event-related information.

With respect to each of Event Information and Analytic Information, one information piece is acquired for one Event ID and one Analytics ID. Furthermore, in the case where only the Event ID is specified in the Nnef_CompositeExposure_Subscribe request, only Event Information is input to the Notify API 112. In the case where only the Analytics ID is specified in the Nnef_CompositeExposure_Subscribe request, only Analytic Information is input to the Notify API 112.

Notification Correlation Information is identification information used by the NF as an inquiry destination for information to identify the request from the NEF server 1. Notification Correlation Information is assigned by the inquiry destination for information. The inquiry destination for information is the AMF, the SMF, or the UDR, for example.

The list of UEs satisfying the condition specified in the Nnef_CompositeExposure_Subscribe request is acquired by compositing, under Condition, Event Information and/or Analytic Information acquired according to the specified Event ID(s) and/or Analytics ID(s). Note that information pieces included in Event Information and Analytic Information are different depending on the Event ID and the Analytics ID, and the list of UEs is not necessarily included. The list of UEs is an example of information that is acquired by compositing Event Information and/or Analytic Information under Condition.

Event Information and Analytic Information are examples of "information that is obtained for a plurality of identification information pieces specifying types of information related respectively to a first service and a second service". Furthermore, information that is acquired by compositing Event Information and/or Analytic Information under Condition is an example of "first information".

Next, an output from the Notify API 112 ("Outputs" in FIG. 5) is a result of performing processing in relation to the Nnef_CompositeExposure_Subscribe request. The Notify API 112 transmits the Nnef_CompositeExposure Notify message to the AF server 50, and thus, the output from the Notify API 112 may be said to be information that is included in the Nnef_CompositeExposure Notify message. More specifically, the output from the Notify API 112 is information that is acquired by compositing Event Information and/or Analytic Information under Condition. In the case where Action is specified in the Nnef_CompositeExposure_Subscribe request, a result of execution of specified Action is also output from the Notify API 112. Note that specifications of the Notify API 112 illustrated in FIG. 5 are an example, and the specifications of the Notify API 112 are not limited to the example illustrated in FIG. 5.

<Flow of Processes>

Figure 6:
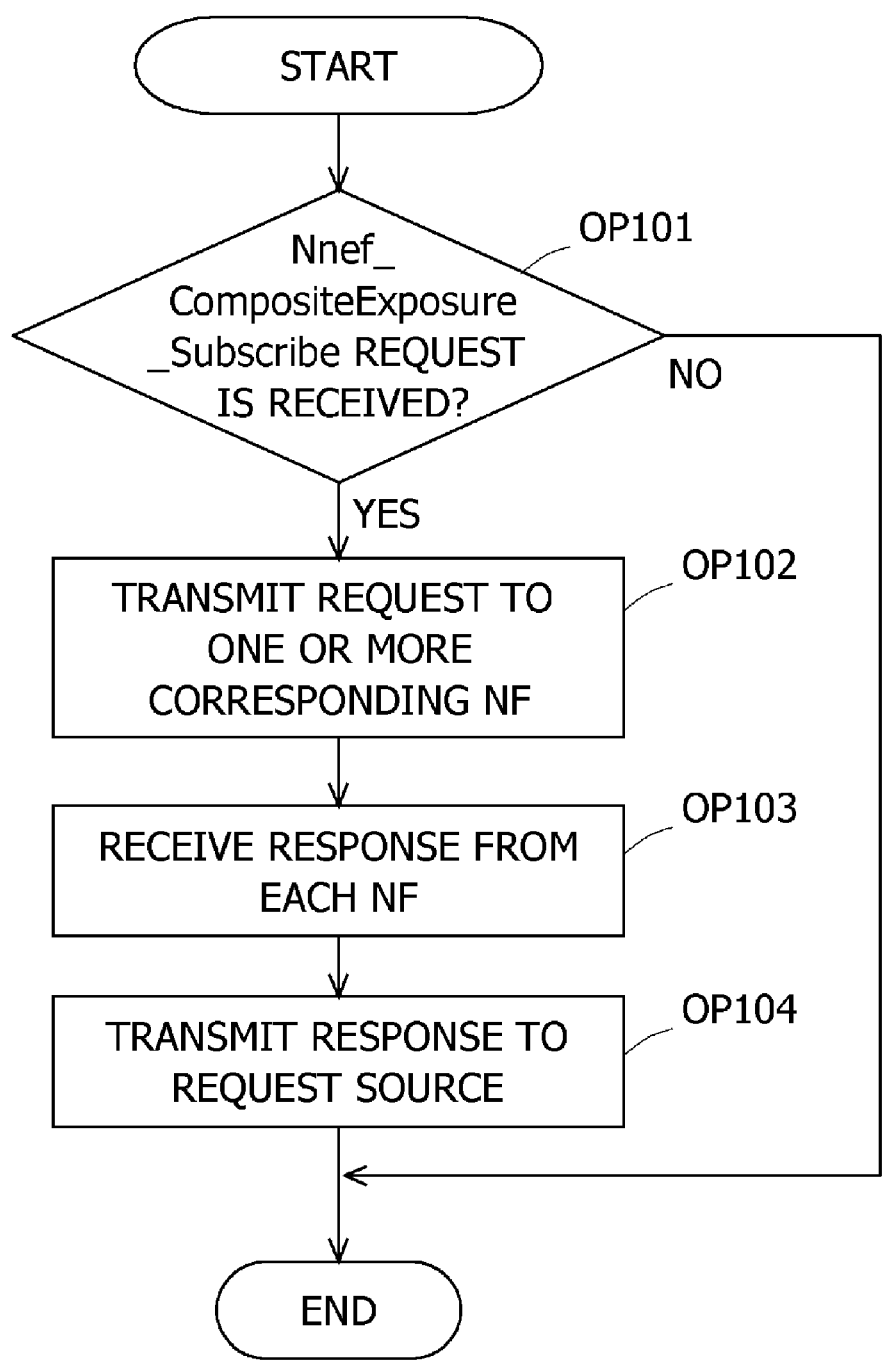
FIG. 6 is an example of a flowchart of processes by the Subscribe API.

FIG. 6 is an example of a flowchart of processes by the Subscribe API 111. The processes illustrated in FIG. 6 are repeatedly performed every predetermined period of time during operation of the NEF server 1. In OP101, the processor 101 determines whether the Nnef_CompositeExposure_Subscribe request is received or not. In the case where the Nnef_CompositeExposure_Subscribe request is received (OP101: YES), the process proceeds to OP102. In the case where the Nnef_CompositeExposure_Subscribe request is not received (OP101: NO), the processes illustrated in FIG. 6 are ended.

In OP102, the processor 101 transmits a request for information acquisition to one or more NFs corresponding to the Event ID and/or the Analytics ID included in the Nnef_CompositeExposure_Subscribe request. For example, in the case where the Event IDs are Location Report, UE moving in or out of Area of Interest, Access Type, Location, Reachability Filter, Total number of Transactions, and Number of UEs present in a geographical area, the processor 101 transmits the request to the AMF. In relation to the Analytics ID, the processor 101 transmits the request to the NWDAF. An API is prepared for each request for information acquisition to each NF. The processor 101 transmits the request for information acquisition using the corresponding API according to the NF as the inquiry destination.

In OP103, the processor 101 receives a response from the one or more NFs to which the request is transmitted in OP102. This response is a response indicating that the request was received. In OP104, the processor 101 transmits the Nnef_CompositeExposure_Subscribe response to the AF server 50 that is the transmission source of the Nnef_CompositeExposure_Subscribe request. The processes illustrated in FIG. 6 are then ended.

Figure 7:
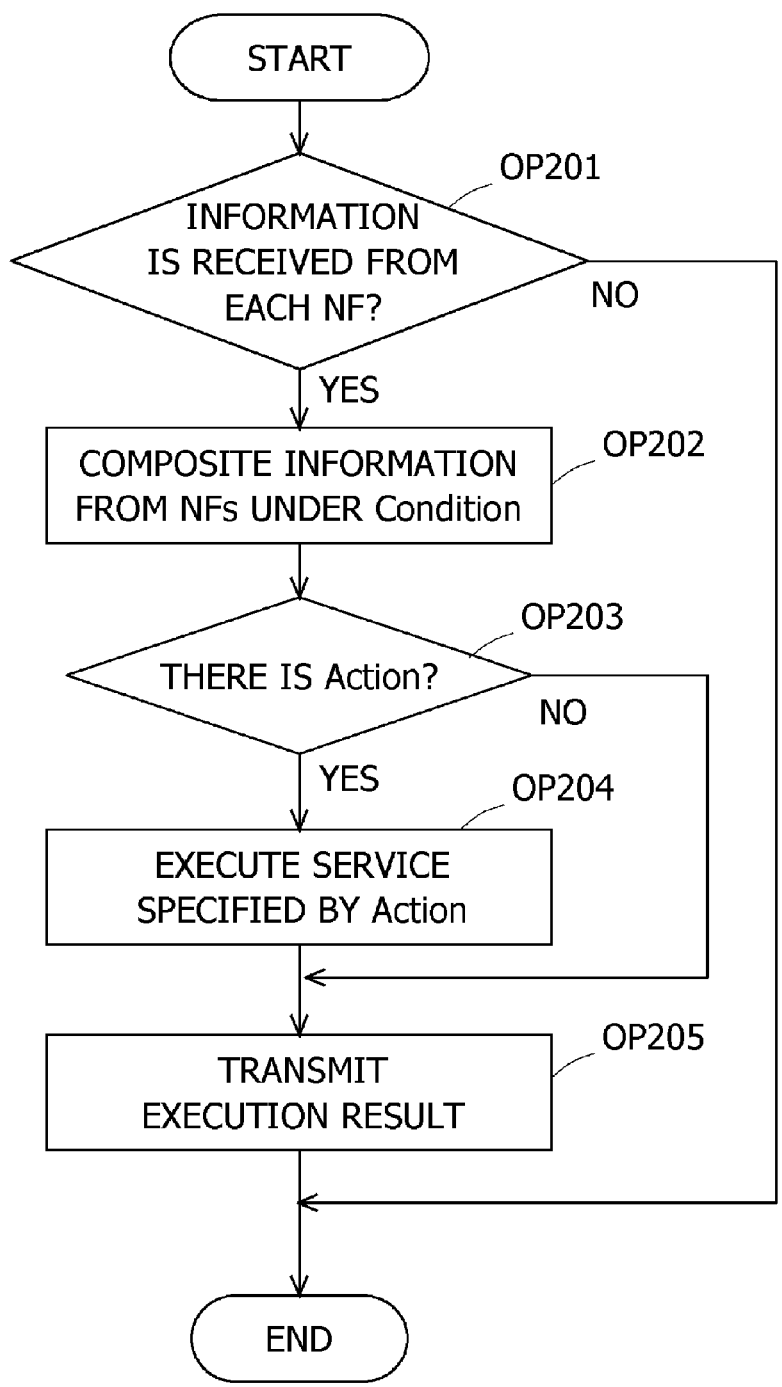
FIG. 7 is an example of a flowchart of processes by the Notify API.

FIG. 7 is an example of a flowchart of processes by the Notify API 112. For example, the processes illustrated in FIG. 7 are started when the Nnef_CompositeExposure_Subscribe response is transmitted, and are repeatedly performed until Expiry time is reached or until an Nnef_CompositeExposure_unSubscribe message indicating stopping of the Nnef_CompositeExposure_Subscribe service is received from the AF server 50.

In OP201, the processor 101 determines whether Event Information and/or Analytic Information is received from the one or more NFs to which the request for information acquisition was transmitted in OP102. In the case where Event Information and/or Analytic Information is received from the one or more NFs (OP201: YES), the process proceeds to OP202. In the case where Event Information and/or Analytic Information is not received from the one or more NFs (OP201: NO), the processes illustrated in FIG. 7 are ended and are then repeated.

In OP202, the processor 101 composites a plurality of pieces of received Event Information and/or Analytic Information under Condition included in the Nnef_CompositeExposure_Subscribe request. In OP203, the processor 101 determines whether Action is included in the Nnef_CompositeExposure_Subscribe request received in OP101. In the case where Action is included in the Nnef_CompositeExposure_Subscribe request (OP203: YES), the process proceeds to OP204. In the case where Action is not included in the Nnef_CompositeExposure_Subscribe request (OP203: NO), the process proceeds to OP205.

In OP204, the processor 101 executes a service specified by Action. The service specified by Action is executed by the processor 101 through an API corresponding to the service specified by Action. In OP205, the processor 101 transmits an execution result by the Nnef_CompositeExposure Notify message. In the case where Action is included in the Nnef_CompositeExposure_Subscribe request, the execution result of the service specified by Action is also included. The processes illustrated in FIG. 7 are then ended.

Note that the processes by the Subscribe API 111 illustrated in FIG. 6 and the processes by the Notify API 112 illustrated in FIG. 7 are examples, and the processes illustrated in FIGS. 6 and 7 are not restrictive. Processes may be added as appropriate according to the embodiment.

FIG. 8 is a diagram illustrating an example of a sequence of the Nnef_CompositeExposure service. The example illustrated in FIG. 8 illustrates a sequence of processes for a case where an Nnef_CompositeExposure_Subscribe request including an Event ID #A and an Analytics ID #X is received from the AF server 50. The Event ID #A is an Event ID where the AMF is the inquiry destination. Moreover, in FIG. 8, the Nnef_CompositeExposure_Subscribe request is assumed to include Action.

In S11, the NEF server 1 receives the Nnef_CompositeExposure_Subscribe request from the AF server 50 (FIG. 6, OP101: YES). S12 and S13 are processes that are performed in relation to the Analytics ID #X included in the Nnef_CompositeExposure_Subscribe request. In S12, the NEF server 1 transmits, to an NWDAF 2, an Nnwdaf_AnalyticsSubscription_Subscribe request that is a request for information acquisition (FIG. 6, OP102). In S13, the NEF server 1 receives, from the NWDAF 2, an Nnwdaf_AnalyticsSubscription_Subscribe response indicating that the Nnwdaf_AnalyticsSubscription_Subscribe request was received (FIG. 6, OP103).

S14 and S15 are processes that are performed in relation to the Event ID MA included in the Nnef_CompositeExposure_Subscribe request. In S14, the NEF server 1 transmits, to an AMF 3, an Namf_EventExposure_Subscribe request that is a request for information acquisition (FIG. 6, OP102). In S15, the NEF server 1 receives, from the AMF 3, an Namf_EventExposure_Subscribe response indicating that the Namf_EventExposure_Subscribe request was received (FIG. 6, OP103).

In S16, because a response is received from each of the NWDAF 2 and the AMF 3, the NEF server 1 transmits the Nnef_CompositeExposure_Subscribe response to the AF server 50 (FIG. 6, OP104).

In S21, the NEF server 1 receives, from the NWDAF 2, Analytic Information corresponding to the Analytics ID #X (FIG. 7, OP201: YES). Analytic Information is transmitted from the NWDAF 2 by an Nnwdaf_AnalyticsSubscription_Notify message. In S22, the NEF server 1 receives, from the AMF 3, Event Information corresponding to the Event ID #A (FIG. 7, OP201: YES). Event Information is transmitted from the AMF 3 by an Namf_EventExposure_Notify message.

In S23, the NEF server 1 composites Analytic Information and Event Information that are received, under Condition included in the Nnef_CompositeExposure_Subscribe request (FIG. 7, OP202). Furthermore, the NEF server 1 executes Action included in the Nnef_CompositeExposure_Subscribe request, in relation to the UE included in the information that is obtained by compositing Analytic Information and Event Information (FIG. 7, OP204).

In S24, the NEF server 1 transmits an execution result of the process for the Nnef_CompositeExposure_Subscribe request, to the AF server 50 by the Nnef_CompositeExposure Notify message (FIG. 7, OP205). As the execution result of the process for the Nnef_CompositeExposure_Subscribe request, the AF server 50 is able to acquire information that is acquired by compositing information pieces corresponding to the Event ID #A and the Analytics ID #X under a specified condition, and an execution result of specified Action regarding the UE included in the acquired information.

<Operations and Effects of First Embodiment>

In the first embodiment, thanks to the Nnef_CompositeExposure service, the AF server 50 may acquire, through one API, information corresponding to the Event ID and information corresponding to the Analytics ID, which are normally acquired through separate APIs. Furthermore, thanks to the Nnef_CompositeExposure service, the AF server 50 may acquire information that is obtained by compositing, under a specified condition, at least two information pieces among information corresponding to the Event ID(s) and/or information corresponding to the Analytics ID(s).

Thanks to the Nnef_CompositeExposure service, the AF server 50 may acquire information that is obtained by compositing a plurality of specified types of information pieces under a specified condition, by transmitting a request to the NEF server 1 just once. Compared to when the AF server 50 transmits a request to the NEF server 1 in relation to each type, and receives and composites, under a specified condition, a plurality of specified types of information pieces, it suffices if communication is performed to and from between the NEF server 1 and the AF server 50 just once. Accordingly, the Nnef_CompositeExposure service enables a time until information that is obtained by compositing a plurality of specified types of information pieces under a specified condition is acquired to be reduced. Moreover, bandwidth usage by communication between the NEF server 1 and the AF server 50 may be reduced.

Furthermore, with the Nnef_CompositeExposure service, Action to be executed in relation to the UE included in the information that is acquired by compositing information pieces corresponding to the Event ID(s) and/or the Analytics ID(s) under a specified condition may be specified in the Nnef_CompositeExposure_Subscribe request. Accordingly, in addition to information that is obtained by compositing a plurality of specified types of information pieces under a specified condition being acquired through one API, specified Action may be executed on the UE, and processing delay may be reduced at the AF server 50.

OTHER EMBODIMENTS

The embodiments described above are examples, and the present disclosure may be changed and carried out as appropriate without departing from the gist of the present disclosure.

In the first embodiment, information that is acquired by the Nnef_EventExposure service and information that is acquired by the Nnef_AnalyticsExposure service may be acquired by the Nnef_CompositeExposure service. Such a case is not restrictive, and the Nnef_CompositeExposure service may enable acquisition of information that is acquired by other services, in addition to the Nnef_EventExposure service and the Nnef_AnalyticsExposure service. For example, by including identification information, of another service, equivalent to the Event ID and the Analytics ID in the Nnef_CompositeExposure_Subscribe request, information that can be acquired by the service may be acquired by the Nnef_CompositeExposure service.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus that performs as a Network Exposure Function (NEF), comprising a processor configured to:
receive, from a request source, a request including at least one piece of information indicating one or more Event IDs and information indicating one or more Analytics IDs;

transmit one or more requests to one or more Network Functions (NFs) based on the request received from the request source;

receive, from the one or more NFs, one or more responses corresponding to the one or more requests; and transmit first information based on the one or more responses to the request source, wherein, when the request received from the request source includes the information indicating one or more Event IDs and the information indicating one or more Analytics IDs, the processor consolidates information received from one or more Access and Mobility Management Functions (AMFs) to which the processor transmits one or more requests based on the one or more Event IDs and information received from one or more Network Data Analytics Functions (NWDAFs) to which the processor transmits one or more requests based on the one or more Analytics IDs to acquire the first information, and performs the transmitting the first information to the request source.

2. The information processing apparatus according to claim 1, wherein the request includes action information specifying an action that is executed in relation to a user terminal included in the first information, and the processor executes the action specified by the action information on the user terminal included in the first information.

3. The information processing apparatus according to claim 1, wherein the request further includes application identification information specifying an application, and the processor transmits second information, from the first information, matching the application identification information.

4. The information processing apparatus according to claim 1, wherein the request further includes area identification information specifying an area as a target, and the processor transmits third information, from the first information, matching the area identification information.

5. The information processing apparatus according to claim 1, wherein the processor is configured to transmit the first information that is obtained by compositing such that an overlapping part of the information received from the one or more AMFs and the information received from the one or more NWDAFs is acquired.

6. The information processing apparatus according to claim 1, wherein the processor is configured to transmit a list of user terminals as the first information, the list of user terminals derived by compositing the information received from the one or more AMFs and the information received from the one or more NWDAFs.

7. The information processing apparatus according to claim 1, wherein, when the request received from the request source includes the information indicating the one or more Event IDs and the information indicating the one or more Analytics IDs, the processor is further configured to:

transmit one or more Namf_EventExposure_Subscribe requests to the one or more AMFs based on the one or more Event IDs;

receive the information from the one or more AMFs;

transmit one or more Nnwdaf_AnalyticsSubscription_Subscribe requests to the one or more NWDAFs based on the one or more Analytics IDs;

receive the information from the one or more NWDAFs;

consolidate the information received from the one or more AMFs and the information received from the one or more NWDAFs to acquire the first information; and transmit the first information to the request source.

8. A method executed by a Network Exposure Function (NEF) comprising:

receiving, from a request source, a request including at least one piece of information indicating one or more Event IDs and information indicating one or more Analytics IDs;

transmitting one or more requests to one or more Network Functions (NFs) based on the request received from the request source;

receiving, from the one or more NFs, one or more responses corresponding to the one or more requests; and transmitting first information based on the one or more responses to the request source, wherein, when the request received from the request source includes the information indicating one or more Event IDs and the information indicating one or more Analytics IDs, the NEF consolidates information received from one or more AMFs (Access and Mobility Management Function) to which the NEF transmits one or more requests based on the one or more Event IDs and information received from one or more NWDAFs (Network Data Analytics Function) to which the NEF transmits one or more requests based on the one or more Analytics IDs to acquire the first information, and perform the transmitting the first information to the request source.

9. A non-transitory computer-readable recording medium having recorded thereon a program executable by a computer performing as a Network Exposure Function (NEF), the program comprising instructions which cause the computer to:

receive, from a request source, a request including at least one pieces of information indicating one or more Event IDs and information indicating one or more Analytics IDs;

transmit one or more requests to one or more Network Functions (NFs) based on the request received from the request source;

receive, from the one or more NFs, one or more responses corresponding to the one or more requests; and transmit first information based on the one or more responses to the request source, wherein, when the request received from the request source includes the information indicating one or more Event IDs and the information indicating one or more Analytics IDs, the computer consolidates information received from one or more Access and Mobility Management Functions (AMFs) to which the computer transmits one or more requests based on the one or more Event IDs and information received from one or more Network Data Analytics Functions (NWDAFs) to which the computer transmits one or more requests based on the one or more Analytics IDs to acquire the first information, and performs the transmitting the first information to the request source.

* * * * *